US009223300B2

(12) United States Patent
Tanaka

(10) Patent No.: US 9,223,300 B2
(45) Date of Patent: Dec. 29, 2015

(54) SERVO-PARAMETER ADJUSTING APPARATUS

(75) Inventor: Shinji Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/394,311

(22) PCT Filed: May 17, 2012

(86) PCT No.: PCT/JP2012/062625
§ 371 (c)(1),
(2), (4) Date: Oct. 14, 2014

(87) PCT Pub. No.: WO2013/171875
PCT Pub. Date: Nov. 21, 2013

(65) Prior Publication Data
US 2015/0084572 A1   Mar. 26, 2015

(51) Int. Cl.
*G05B 11/01*  (2006.01)
*G05B 11/36*  (2006.01)
(Continued)

(52) U.S. Cl.
CPC ............... *G05B 11/36* (2013.01); *G05B 11/42* (2013.01); *G05B 19/19* (2013.01)

(58) Field of Classification Search
USPC ................ 318/568.1, 560, 568.11–568.25; 324/121 R, 638, 650; 345/440.1, 473; 702/108, 76, 105, 94, 185; 700/28, 31, 700/54, 37, 52, 95, 97; 715/700, 202, 203, 715/706, 856
See application file for complete search history.

(56) References Cited

U.S. PATENT DOCUMENTS 5,075,618 A * 12/1991 Katayama .................. 324/76.27
5,285,378 A *  2/1994 Matsumoto ..................... 700/37
(Continued)

FOREIGN PATENT DOCUMENTS

CN    1967415 A    5/2007
CN    1989465 A    6/2007
(Continued)

OTHER PUBLICATIONS

International Search Report of PCT/JP2012/062625 dated Aug. 14, 2012 [PCT/ISA/210].
(Continued)

*Primary Examiner* — Shawki S Ismail
*Assistant Examiner* — Jorge L Carrasquillo
(74) *Attorney, Agent, or Firm* — Sughrue Mion, PLLC; Richard C. Turner

(57) ABSTRACT

A servo-parameter adjusting apparatus includes an acquiring unit that acquires an adjustment result measured by a servo control apparatus concerning position adjustment for a control target performed according to the servo parameters set in the servo control apparatus; a display control unit that simultaneously displays, on a display screen, a waveform corresponding to the acquired adjustment result, waveform values that are attributes concerning a part of the waveform, and servo parameters corresponding to the waveform; and a waveform-value changing unit that changes the displayed waveform values. When a waveform value is changed, the display control unit displays the changed waveform value on the display screen and displays, on the display screen, a waveform corresponding to the changed waveform value and a servo parameter corresponding to the changed waveform value.

10 Claims, 8 Drawing Sheets

(51) Int. Cl.
  *G05B 11/42* (2006.01)
  *G05B 19/19* (2006.01)

(56) References Cited

U.S. PATENT DOCUMENTS

| | | | | |
|---|---|---|---|---|
| 5,475,291 | A | * | 12/1995 | Yoshida et al. .......... 318/568.22 |
| 5,656,906 | A | * | 8/1997 | Iwashita et al. .......... 318/568.23 |
| 5,757,356 | A | * | 5/1998 | Takasaki et al. .............. 700/276 |
| 6,198,246 | B1 | * | 3/2001 | Yutkowitz .................... 318/561 |
| 6,377,281 | B1 | * | 4/2002 | Rosenbluth et al. .......... 715/700 |
| 6,850,806 | B2 | * | 2/2005 | Yutkowitz ....................... 700/54 |
| 2001/0020192 | A1 | | 9/2001 | Ito et al. |
| 2003/0083772 | A1 | * | 5/2003 | Shiba et al. .................. 700/180 |
| 2003/0149501 | A1 | | 8/2003 | Tuszynski |
| 2003/0176938 | A1 | | 9/2003 | Tuszynski |
| 2004/0167648 | A1 | | 8/2004 | Tuszynski |
| 2005/0055110 | A1 | | 3/2005 | Tuszynski |
| 2005/0246149 | A1 | | 11/2005 | Tuszynski |
| 2006/0118169 | A1 | | 6/2006 | Junk |
| 2007/0118237 | A1 | | 5/2007 | Wang |
| 2007/0162214 | A1 | | 7/2007 | Junk et al. |
| 2007/0219657 | A1 | | 9/2007 | Tuszynski |
| 2009/0326682 | A1 | | 12/2009 | Junk et al. |
| 2011/0178622 | A1 | | 7/2011 | Tuszynshi |

FOREIGN PATENT DOCUMENTS

| | | | |
|---|---|---|---|
| JP | 05-282002 | A | 10/1993 |
| JP | 07-084609 | A | 3/1995 |
| JP | 08-221132 | A | 8/1996 |
| JP | 10-333704 | A | 12/1998 |
| JP | 2000-222005 | A | 8/2000 |
| JP | 2001-175303 | A | 6/2001 |
| JP | 2009-124803 | A | 6/2009 |
| JP | 2009124803 | A * | 6/2009 |
| JP | 4697663 | B2 | 6/2011 |
| TW | 200506559 | A * | 2/2005 |
| TW | M387999 | U1 | 9/2010 |

OTHER PUBLICATIONS

Communication dated Sep. 15, 2014 from the Taiwanese Intellectual Property Office in counterpart Taiwanese Patent Application No. 101141521.

Communication dated Jul. 24, 2015 from the State Intellectual Property Office in the P.R.C. in counterpart application No. 201280073200.9.

* cited by examiner

SERVO-PARAMETER ADJUSTING APPARATUS

CROSS REFERENCE TO RELATED APPLICATIONS

This application is a National Stage of International Application No. PCT/JP2012/062625, filed May 17, 2012, the contents of which are incorporated herein by reference in its entirety.

FIELD

The present invention relates to a servo-parameter adjusting apparatus.

BACKGROUND

Patent Literature 1 mentions that, in an input apparatus, when temperature control by a temperature regulator is not satisfactorily performed, to change a control degree by control parameters, a correction degree value is calculated and output to the temperature regulator. Specifically, a correlative degree distribution is displayed on a CRT concerning a plurality of parameters. When a user performs pressing operation on the CRT, the position of the pressing is displayed on the CRT, a vector starting from the origin and ending at the pressing position is decomposed into vector components to calculate a correction degree value, and the correction degree value is output to the temperature regulator. Consequently, according to Patent Literature 1, by intuitively performing a correlative degree input concerning a plurality of parameters through visual inspection, it is possible to easily obtain degree values having a proper correlation as degree values of the respective parameters.

Patent Literature 2 mentions that, in a control-model adjusting apparatus, a graph of an input response characteristic of a transfer function representing a dynamic characteristic model of a control target is displayed on a screen and, when slider bars of a gain, a time constant, and a dead time are moved up and down by a pointer, the graph on the screen is simultaneously changed according to the movement of the slider bars. Consequently, according to Patent Literature 2, by adjusting the graph representing the dynamic characteristic model of the control target on the screen, it is possible to perform work of modeling of the dynamic characteristic model, which conventionally requires a great deal of labor, in a short time without requiring special expertise.

Patent Literature 3 mentions that, in a PID tuning apparatus, a curved line representing a step response characteristic of an automatic control system and broken lines representing control parameters (a rise time, an overshoot amount, and a control stabilization time) are displayed on a screen and, when an operator moves the broken lines representing the control parameters, PID tuning is performed and the curved line on the screen changes according to the movement of the broken lines. Consequently, according to Patent Literature 3, it is possible to perform the PID tuning according to control parameters corresponding to an actual movement of a control target process.

CITATION LIST

Patent Literature

Patent Literature 1: Japanese Patent Application Laid-Open No. H5-282002

Patent Literature 2: Japanese Patent Application Laid-Open No. H7-84609

Patent Literature 3: Japanese Patent Application Laid-Open No. H10-333704

SUMMARY

Technical Problem

The input apparatus described in Patent Literature 1 merely changes, for the temperature regulator, a control degree by the control parameters. The input apparatus is based on the premise that the control parameters themselves are not changed. Therefore, in Patent Literature 1, there is no description concerning how an adjustment time of the control parameters (servo parameters) is reduced.

The technologies described in Patent Literatures 2 and 3 are based on the premise that the control parameters are changed to obtain a desired waveform. Therefore, work for "a change of parameters to a check of a waveform" is repeated in a trial and error manner until the desired waveform is obtained. It takes a long time to obtain optimum parameters. A person who checks a waveform changes the parameters by himself or herself. Therefore, the person needs to be familiar with parameter specifications. It takes an extremely long time to check the parameter specifications.

In the technology described in Patent Literature 2, because only elements used for actual control are selected in a calculated transfer function, the control can be performed without using a dynamic characteristic model that is quite different from an actual response. However, simply by selecting the elements used for the actual control, it is impossible to actually check whether the dynamic characteristic model is quite different from the actual response. Therefore, it is necessary to perform work for separately performing a verification in a real machine to identify a dynamic characteristic model close to the actual response and, if the dynamic characteristic model is quite different from the actual response, correcting the dynamic characteristic model. Therefore, as a result, work for modeling of the dynamic characteristic model tends to be performed for a long time. That is, in the technology described in Patent Literature 2, it is difficult to reduce an adjustment time for parameters (servo parameters) used for the actual control.

In the technology described in Patent Literature 3, because the entire waveform changes when the operator moves the broken lines representing the control parameters, it is difficult to change only a part of the waveform. Therefore, when the operator desires to change only a part of the waveform, the operator repeats work for "a change of parameters to a check of a waveform" in a trial and error manner. It takes a lot of time to obtain a desired waveform. That is, in the technology described in Patent Literature 3, when the operator desires to change only a part of the waveform, it is difficult to reduce an adjustment time for parameters (servo parameters).

The PID tuning apparatus described in Patent Literature 3 merely displays one curved line representing the step response characteristic and does not have a function of displaying a plurality of waveforms. Therefore, when the operator desires to change a plurality of waveforms, the operator needs to display the waveforms one by one in order. An enormous amount of time tends to be required to obtain desired waveforms of the waveforms. That is, in the technology described in Patent Literature 3, when the operator desires to change a plurality of waveforms, it is difficult to reduce an adjustment time for parameters (servo parameters).

The present invention has been devised in view of the above, and it is an object of the present invention to obtain a servo-parameter adjusting apparatus that can reduce an adjustment time for servo parameters to be set in a servo control apparatus.

Solution to Problem

The present invention is directed to a servo-parameter adjusting apparatus that achieves the object. The servo-parameter adjusting apparatus performs adjustment of servo parameters to be set in a servo control apparatus that controls a motor for driving a control target. The servo-parameter adjusting apparatus includes an acquiring unit that acquires, from the servo control apparatus, an adjustment result measured by the servo control apparatus concerning position adjustment for the control target performed according to the servo parameters set in the servo control apparatus; a display control unit that simultaneously displays, on a display screen, a waveform corresponding to the acquired adjustment result, waveform values that are attributes concerning a part of the waveform, and servo parameters corresponding to the waveform; and a waveform-value changing unit that changes the displayed waveform values. When a waveform value is changed by the waveform-value changing unit, the display control unit displays the changed waveform value on the display screen and displays, on the display screen, a waveform corresponding to the changed waveform value and a servo parameter corresponding to the changed waveform value.

Advantageous Effects of Invention

According to the present invention, it is possible to automatically edit the servo parameters to appropriate values simply by editing the waveform values displayed on the display screen to desired values. Therefore, it is unnecessary to perform parameter adjustment in a trial and error manner, which reduces adjustment time for the servo parameters to be set in the servo control apparatus.

DESCRIPTION OF EMBODIMENTS

Embodiments of a servo parameter adjusting apparatus according to the present invention are explained in detail below with reference to the drawings. Note that the present invention is not limited by the embodiment.

First Embodiment

Figure 1:
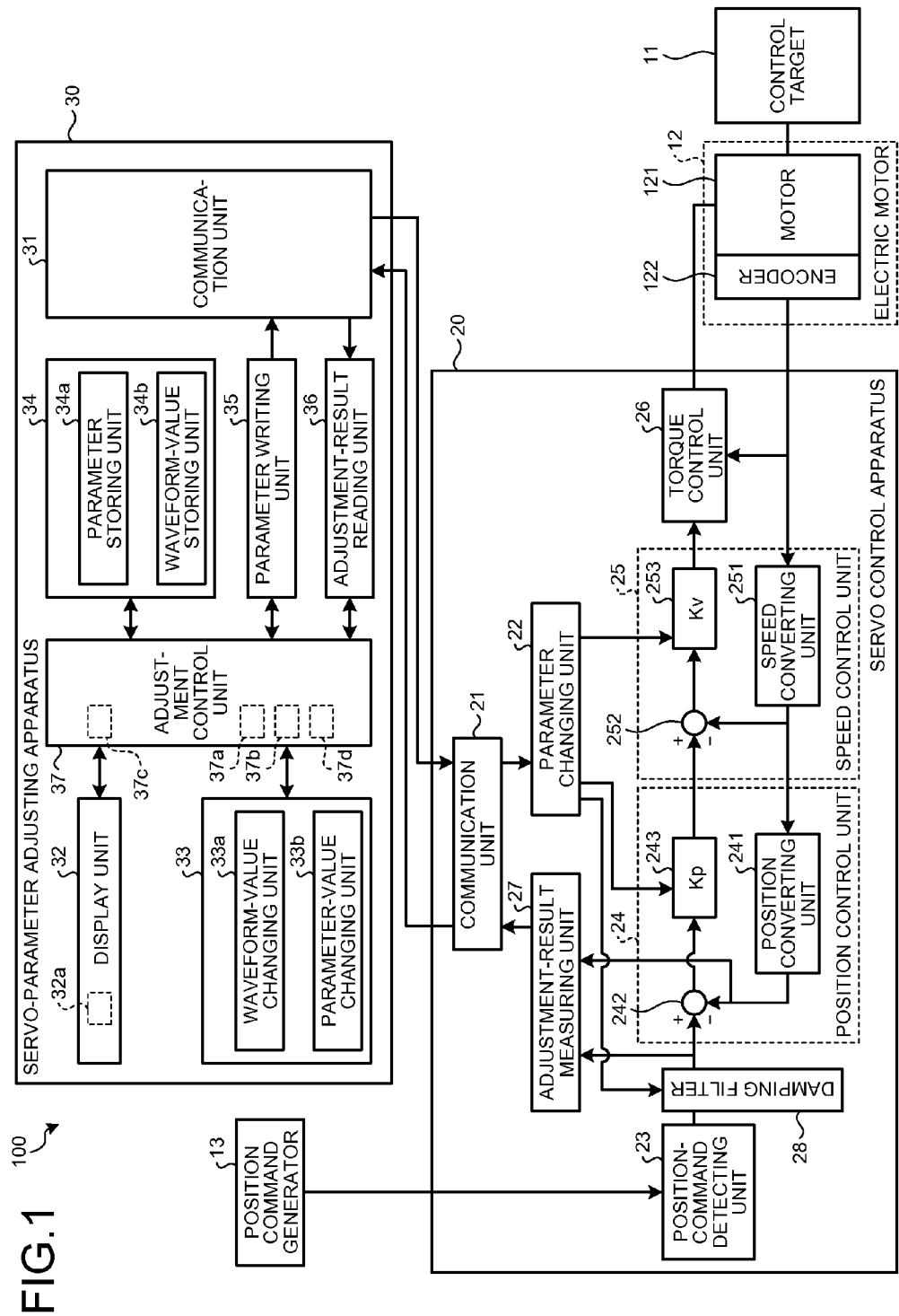
FIG. 1 is a diagram of the configuration of a servo control system including a servo-parameter adjusting apparatus according to a first embodiment.
Figure 2:
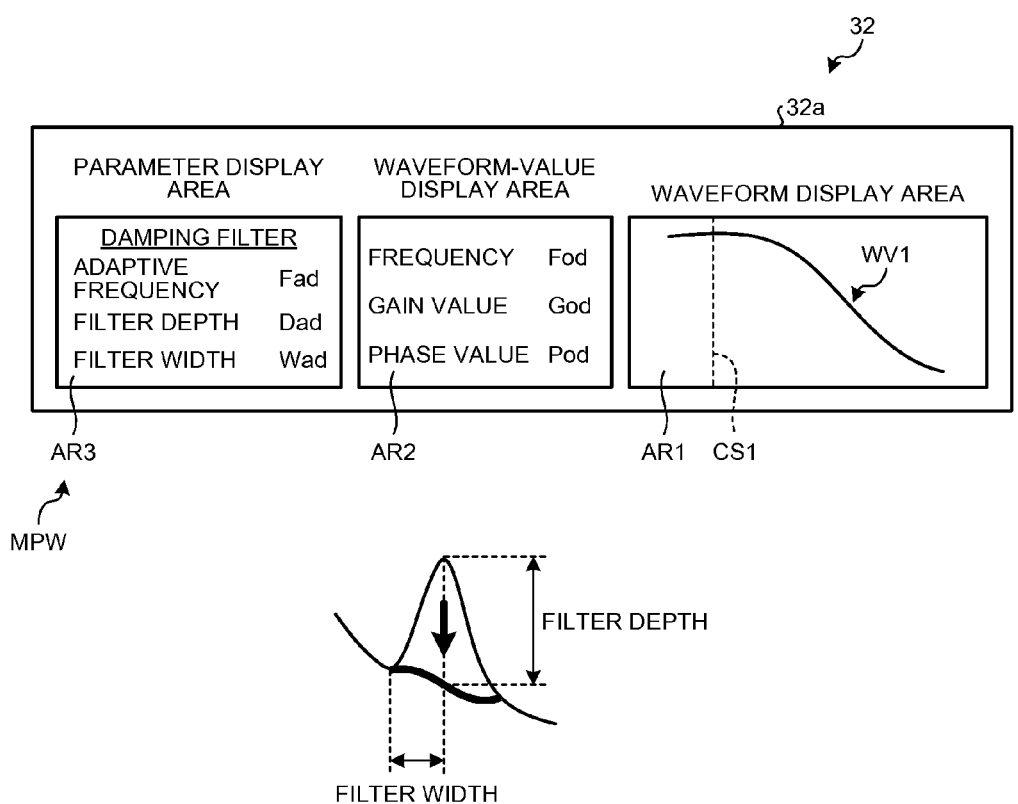
FIG. 2 is a diagram of the operation of a waveform-value changing unit and a display control unit in the first embodiment.

A servo-parameter adjusting apparatus 30 according to a first embodiment is explained with reference to FIG. 1. FIG. 1 is a diagram of the configuration of a servo control system 100 including the servo-parameter adjusting apparatus 30.

In the servo control system 100, the servo-parameter adjusting apparatus 30 is an apparatus for setting, in a servo control apparatus 20, servo parameters used for servo control performed by the servo control apparatus 20. The servo control apparatus 20 performs the servo control according to the set servo parameters and performs, for example, position adjustment for a control target 11 via a motor 121. In this case, the servo-parameter adjusting apparatus 30 adjusts the servo parameters to appropriate values and sets the servo parameters in the servo control apparatus 20 such that the servo control is appropriately performed.

Specifically, the servo control system 100 includes the control target 11, an electric motor 12, a position-command generator 13, the servo control apparatus 20, and the servo-parameter adjusting apparatus 30.

The control target 11 is a machine moved by the servo control such as various machine tools and robots. The electric motor 12 includes the motor 121 that drives the control target 11 and an encoder 122 that acquires position information of the motor 121.

The position-command generator 13 generates a position command for the servo control apparatus 20 and inputs the position command to the servo control apparatus 20 during adjustment of a control gain (a servo parameter).

The servo control apparatus 20 includes a communication unit 21, a parameter-value changing unit 22, a position-command detecting unit 23, a position control unit 24, a speed control unit 25, a torque control unit 26, and an adjustment-result measuring unit 27.

The communication unit 21 performs communication with the servo-parameter adjusting apparatus 30. The parameter-value changing unit 22 sets servo parameters instructed from the servo-parameter adjusting apparatus 30 in the position control unit 24, the speed control unit 25, and a damping filter 28. The position-command detecting unit 23 detects the position command input from the position command generator 13.

The damping filter 28 adjusts the position command with respect to the position command detected by the position-command detecting unit 23 using an adaptive frequency (a servo parameter), a filter width (a servo parameter), and a filter depth (a servo parameter) to suppress residual vibration (e.g., resonance and anti-resonance) of the control target 11 and supplies the position command to the position control unit 24.

The position control unit 24 outputs speed command from a deviation between the adjusted position command and the present position. For example, in the position control unit 24, when a position converting unit 241 acquires position data from position information of the motor 121 output from the encoder 122, a subtracter 242 compares the position command from the position command generator 13 and the position data from the position converting unit 241 and calculates a deviation between the position command and the position data. A speed-command generating unit 243 outputs a speed command obtained by multiplying the deviation output by the subtracter 242 with a position control gain Kp (a servo parameter).

The speed control unit 25 outputs a torque command from a deviation between the speed command and the present speed. For example, in the speed control unit 25, when a speed converting unit 251 acquires speed data from motor position information output from the encoder 122, a subtracter 252 compares the speed command output from the position control unit 24 and the speed data from the speed converting unit 251 and calculates a deviation between the speed command and the speed data. A torque-command generating unit 253 outputs a torque command obtained by multiplying the deviation output by the subtracter 252 with a speed control gain Kv (a servo parameter).

The torque control unit 26 detects an electric current output to the electric motor 12 and performs control of torque.

The adjustment-result measuring unit 27 measures an adjustment result concerning position adjustment from a result obtained by performing the position adjustment with the servo parameters changed by the parameter-value changing unit 22. The adjustment result includes, for example, a setting time until a control operation for the position adjustment stabilizes, a positional deviation amount from a target position during the position adjustment, an overshoot amount during the position adjustment, a position command value during the position adjustment, an operating frequency during the position adjustment, a phase of an operation during the position adjustment, and a control gain during the position adjustment.

The communication unit 21 acquires the measured adjustment result from the adjustment-result measuring unit 27 and transmits the adjustment result to the servo-parameter adjusting apparatus 30 in response to a transmission request from the servo-parameter adjusting apparatus 30.

The servo-parameter adjusting apparatus 30 includes a communication unit 31, an adjustment-result reading unit (acquiring unit) 36, a display unit 32, an adjustment control unit 37, an input unit 33, a storing unit 34, and a parameter writing unit 35.

The communication unit 31 performs communication with the servo control apparatus 20. For example, the communication unit 31 transmits a transmission request to the servo control apparatus 20 to request the servo control apparatus 20 to transmit an adjustment result. The communication unit 31 receives, as a response to the transmission request, a measured adjustment result from the servo control apparatus 20.

The measurement-result reading unit 36 reads the measured adjustment result from the servo control apparatus 20 via the communication unit 31. That is, the adjustment-result reading unit 36 acquires the measured adjustment result from the servo control apparatus 20 via the communication unit 31. The adjustment-result reading unit 36 retains the acquired adjustment result at every time. For example, adjustment-result reading unit 36 stores a setting time, a positional deviation amount, an overshoot amount, a position command value, an operating frequency, a phase of an operation, a control gain, and the like included in the adjustment result in association with one another at every time. The adjustment-result reading unit 36 supplies the adjustment result to the adjustment control unit 37 in response to a request from the adjustment control unit 37.

The display unit 32 is configured by a display device such as a liquid crystal display and includes a display screen 32a. The display unit 32 displays, for example, a mechanical characteristic analysis screen (see FIG. 3) and a command follow-up analysis screen (see FIG. 6) on the display screen 32a.

The adjustment control unit 37 controls the entire servo-parameter adjusting apparatus 30. Specifically, the adjustment control unit 37 includes a first calculating unit 37a, a second calculating unit 37b, a display control unit 37c, and a third calculating unit 37d. The first calculating unit 37a acquires an adjustment result from the adjustment-result reading unit 36, calculates waveform information corresponding to the adjustment result, and supplies the waveform information to the second calculating unit 37b and the display control unit 37c. The waveform information, for example, is a set of coordinate information of points on a waveform that should be displayed. The second calculating unit 37b calculates servo parameters corresponding to the waveform information and supplies the servo parameters to the display control unit 37c. A correspondence relation between the waveform information and the servo parameters can be, for example, experimentally acquired in advance and set in the second calculating unit 37b as a database. The display control unit 37c generates, according to the waveform information and the servo parameters, display information that should be displayed on the display screen 32a. The display control unit 37c simultaneously displays, on the display screen 32a, a waveform corresponding to the adjustment result, waveform values that are attributes concerning a part of the waveform, and servo parameters corresponding to the waveform, according to the generated display information. The waveform values are the attributes concerning a part of the waveform and are, for example, coordinates of a point where a cursor overlaps on the waveform (e.g., a point where a cursor CS1 shown in FIG. 3 overlaps).

Alternatively, the third calculating unit 37d calculates waveform information corresponding to the servo parameters and supplies the waveform information to the display control unit 37c. A correspondence relation between the servo parameters and the waveform information can be, for example, experimentally acquired in advance and set in the third calculating unit 37d as a database. The display control unit 37c generates, according to the waveform information and the servo parameters, display information that should be displayed on the display screen 32a. The display control unit 37c simultaneously displays, on the display screen 32a, a waveform corresponding to the adjustment result, waveform values that are attributes concerning a part of the waveform, and servo parameters corresponding to the waveform, according to the generated display information.

The input unit 33 receives an input from a user. Specifically, the input unit 33 includes a waveform-value changing unit 33a and a parameter-value changing unit 33b. For example, the waveform-value changing unit 33a receives, from the user, an instruction for changing a waveform value displayed on the display screen 32a. The waveform-value changing unit 33a generates, according to the instruction for changing the waveform value, a first changing command for changing the waveform value and supplies the first changing command to the adjustment control unit 37. The first calculating unit 37a of the adjustment control unit 37 calculates, according to the first changing command, waveform information corresponding to the changed waveform value and supplies the waveform information to the second calculating unit 37b and the display control unit 37c. The second calculating unit 37b calculates a servo parameter corresponding to the waveform information, that is, a servo parameter corresponding to the changed waveform value and supplies the servo parameter to the display control unit 37c. The display control unit 37c changes and generates, according to the first changing command, the changed waveform information, and the changed servo parameter, display information that should be displayed on the display screen 32a. The display control unit 37c displays the changed waveform value to be changed on the display screen 32a according to the changed and generated display information and displays a waveform corresponding to the changed waveform value and a servo parameter corresponding to the changed waveform value to be changed on the display screen 32a. Consequently, the user can edit, via the waveform-value changing unit 33a, the waveform value displayed on the display screen 32a and automatically adjust and check a waveform and a servo parameter corresponding to the edited waveform value.

The parameter-value changing unit 33b receives, from the user, an instruction for changing a servo parameter displayed on the display screen 32a. The parameter-value changing unit 33b generates, according to an instruction for changing the servo parameter, a second changing command for changing the servo parameter and supplies the second changing command to the adjustment control unit 37. The third calculating unit 37d of the adjustment control unit 37 calculates, according to the second changing command, waveform information corresponding to the changed servo parameter and supplies the waveform information to the display control unit 37c. The display control unit 37c changes and generates, according to the second changing command and the changed waveform information, display information that should be displayed on the display screen 32a. The display control unit 37c displays the changed servo parameter to be changed on the display screen 32a according to the changed and generated display information and displays a waveform corresponding to the changed servo parameter and a waveform value corresponding to the changed servo parameter to be changed on the display screen 32a. Consequently, the user can edit, via the parameter-value changing unit 33b, the servo parameter displayed on the display screen 32a and automatically adjust and check a waveform and a waveform value corresponding to the edited servo parameter.

The input unit 33 receives, from the user, an instruction for setting the changed servo parameter in the servo control apparatus 20. The input unit 33 generates, according to the instruction for setting the servo parameter, a setting command for setting the servo parameter and supplies the setting command to the parameter writing unit 35 through the adjustment control unit 37.

The storing unit 34 functions as a work area by the adjustment control unit 37 to temporarily store predetermined information and retains and stores necessary information. Specifically, the storing unit 34 includes a parameter storing unit 34a and a waveform-value storing unit 34b. The parameter storing unit 34a stores servo parameters. For example, the parameter storing unit 34a acquires and stores the servo parameters calculated by the second calculating unit 37b of the adjustment control unit 37. For example, the parameter storing unit 34a acquires and stores the servo parameters changed and calculated by the second calculating unit 37b according to the first changing command and the second changing command. That is, the parameter storing unit 34a retains both of the servo parameters before the automatic adjustment and the automatically adjusted servo parameters.

The waveform-value storing unit 34b stores waveform values. For example, the waveform-value storing unit 34b acquires and stores the waveform values displayed by the display control unit 37c of the adjustment control unit 37. For example, the waveform-value storing unit 34b acquires and stores the waveform values displayed to be changed by the display control unit 37c according to the first changing command and the second changing command. That is, the waveform-value storing unit 34b retains both of the waveform values before the automatic adjustment and the automatically adjusted waveform values.

When the parameter writing unit 35 receives a setting command from the input unit 33 through the adjustment control unit 37, the parameter writing unit 35 acquires, according to the setting command, the changed servo parameter from the parameter storing unit 34a through the adjustment control unit 37 and writes the changed servo parameter in the servo control apparatus 20 via the communication unit 31. Consequently, the parameter writing unit 35 sets the changed servo parameter in the servo control apparatus 20.

The operation of the waveform-value changing unit 33a and the display control unit 37c is explained with reference to FIG. 2 to FIG. 7. FIG. 2 to FIG. 7 are diagrams of the operation of the waveform-value changing unit 33a and the display control unit 37c.

The display control unit 37c displays, on the display screen 32a of the display unit 32, a mechanical characteristic analysis screen corresponding to a gain parameter that should be set in the damping filter 28 (see FIG. 1).

For example, as shown in FIG. 2(a), the display control unit 37c displays, on the display screen 32a, a mechanical characteristic analysis screen MPW including a waveform display area AR1, a waveform-value display area AR2, and a parameter display area AR3.

Figure 3:
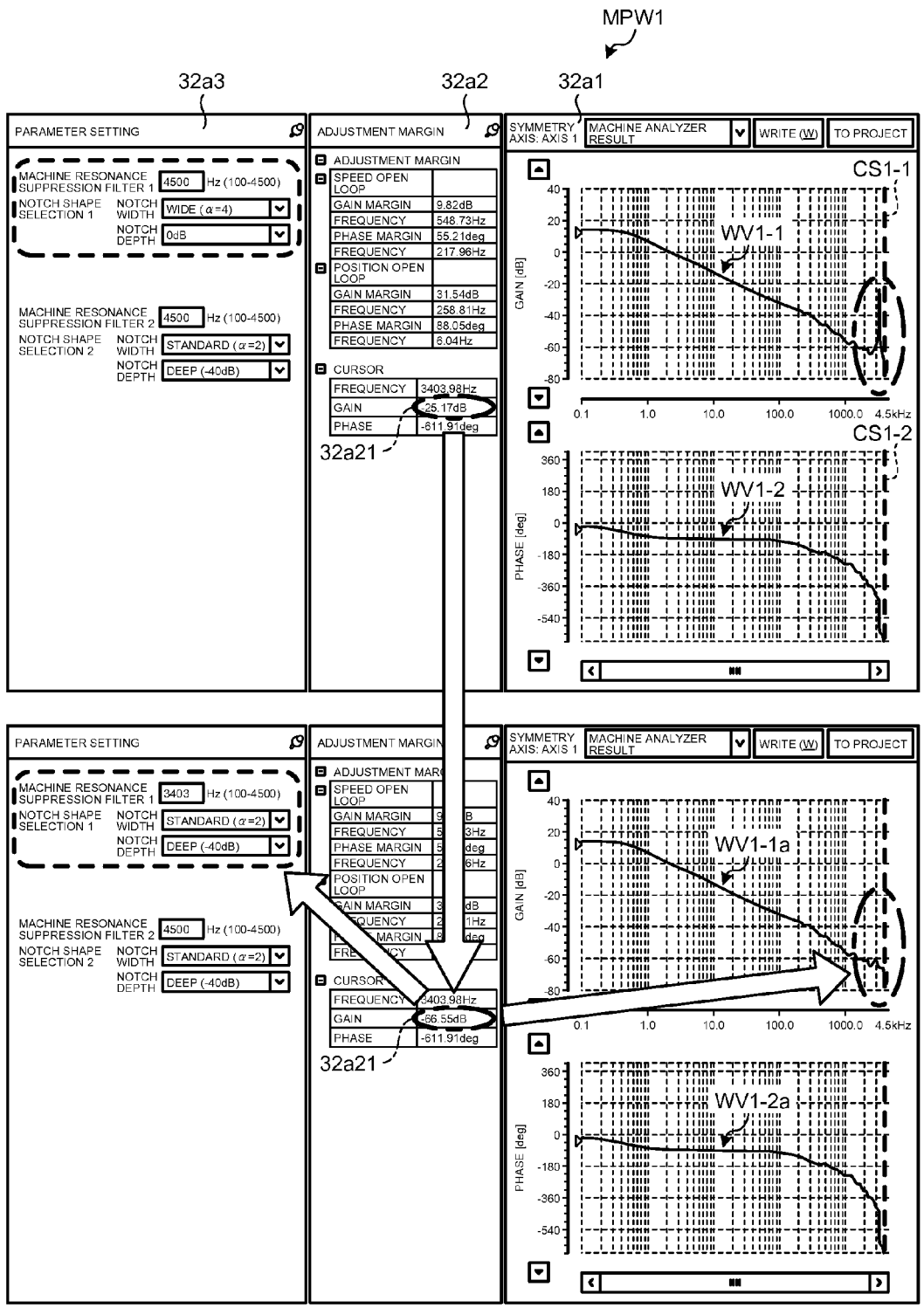
FIG. 3 is a diagram of the operation of the waveform-value changing unit and the display unit in the first embodiment.

The waveform display area AR1 is an area for displaying a waveform WV1. A cursor CS1 is also displayed to overlap a part of the waveform WV1. Specifically, in the waveform display area AR1, a Bode diagram 32a1 shown in FIG. 3 is displayed. A waveform WV1-1 of a gain characteristic with a gain plotted on the ordinate and a frequency plotted on the abscissa and a waveform WV1-2 of a phase characteristic with a phase plotted on the ordinate and a frequency plotted on the abscissa are displayed.

The waveform-value display area AR2 shown in FIG. 2(a) is an area for displaying waveform values. For example, values indicating coordinates of a point where the cursor CS1 overlaps on the waveform WV1 are displayed. Specifically, in the waveform-value display area AR2, an adjustment margin screen 32a2 shown in FIG. 3 is displayed. Values of frequencies indicating abscissa coordinates of points where cursors CS1-1 and CS1-2 overlap in waveforms WV1-1 and WV1-2, a value of a gain indicating an ordinate coordinate of the point where the cursor CS1-1 overlaps on the waveform WV1-1, and a value of a phase indicating an ordinate coordinate of the point where the cursor CS1-2 overlaps on the waveform WV1-2 are displayed.

A parameter display area AR3 shown in FIG. 2(a) is an area for displaying servo parameters. For example, values of an adaptive frequency, a filter depth, and a filter width are displayed as values of servo parameters corresponding to the waveform WV1. As shown in FIG. 2(b), the filter depth and the filter width respectively mean gain characteristics that should be suppressed by the damping filter 28 (see FIG. 1). Specifically, in the parameter display area AR3, a parameter setting screen 32a3 shown in FIG. 3 is displayed. Values of the adaptive frequency, a notch depth (the filter depth), and a notch width (the filter width) are displayed.

Note that, for example, as shown in FIG. 2(b), the second calculating unit 37b of the adjustment control unit 37 can estimate a desired value indicated by a thick line from characteristics before and after a rising edge place and automatically calculate a filter depth and a filter width from a difference between the estimated desired value and an actual characteristic.

For example, the waveform-value changing unit 33a uses the display screen 32a shown in FIG. 2(a) as an input screen and changes displayed waveform values according to an input of at least one of numerical values and characters to the waveform-value display area AR2.

For example, when a mechanical characteristic analysis screen MPW1 shown in an upper diagram of FIG. 3 is displayed, a resonance point is present near a frequency of 3403 hertz. Therefore, the waveform-value changing unit 33a places the cursor CS1-1 and CS1-2 on the resonance point and directly edits a gain value from −25.17 [dB] to −66.55 [dB].

That is, the waveform-value changing unit 33a moves the cursors CS1-1 and CS1-2 to near the frequency of 3403 hertz via a mouse pointer or the like and selects a gain column 32a21 of the adjustment margin screen 32a2. According to selection of the gain column 32a21, the display control unit 37c changes a display form of the gain column 32a21 to a display form for enabling an input. The waveform-value changing unit 33a receives an input of a numerical value "−66.55 dB" via a keyboard or the like. According to the input of the numerical value, as shown in a lower diagram of FIG. 3, the display control unit 37c displays a numerical value (i.e., a waveform value) displayed in the gain column 32a21 to be changed from "−25.17 dB" to "−66.55 dB". At the same time, as shown in the lower diagram of FIG. 3, in the Bode diagram 32a1, the display control unit 37c displays a waveform WV1-1 to be changed to a waveform WV1-1a and displays a waveform WV1-2 to be changed to a waveform WV1-2a. On the parameter setting screen 32a3, the display control unit 37c displays the adaptive frequency (i.e., a gain parameter) to be changed from "4500" to "3403". The display control unit 37c displays the notch width to be changed from "wide (α=4)" to "standard (α=2)" and displays the notch depth to be changed from "0 dB" to "deep (−40 dB)".

Consequently, it is possible to automatically adjust the servo parameters and check the servo parameters on the display screen 32a to suppress, for example, resonance at a frequency "3403.98 Hz".

Alternatively, for example, the waveform-value changing unit 33a uses the display screen 32a shown in FIG. 2(a) as an input screen and changes displayed waveform values according to an input by the mouse pointer to the waveform display area AR1.

Figure 4:
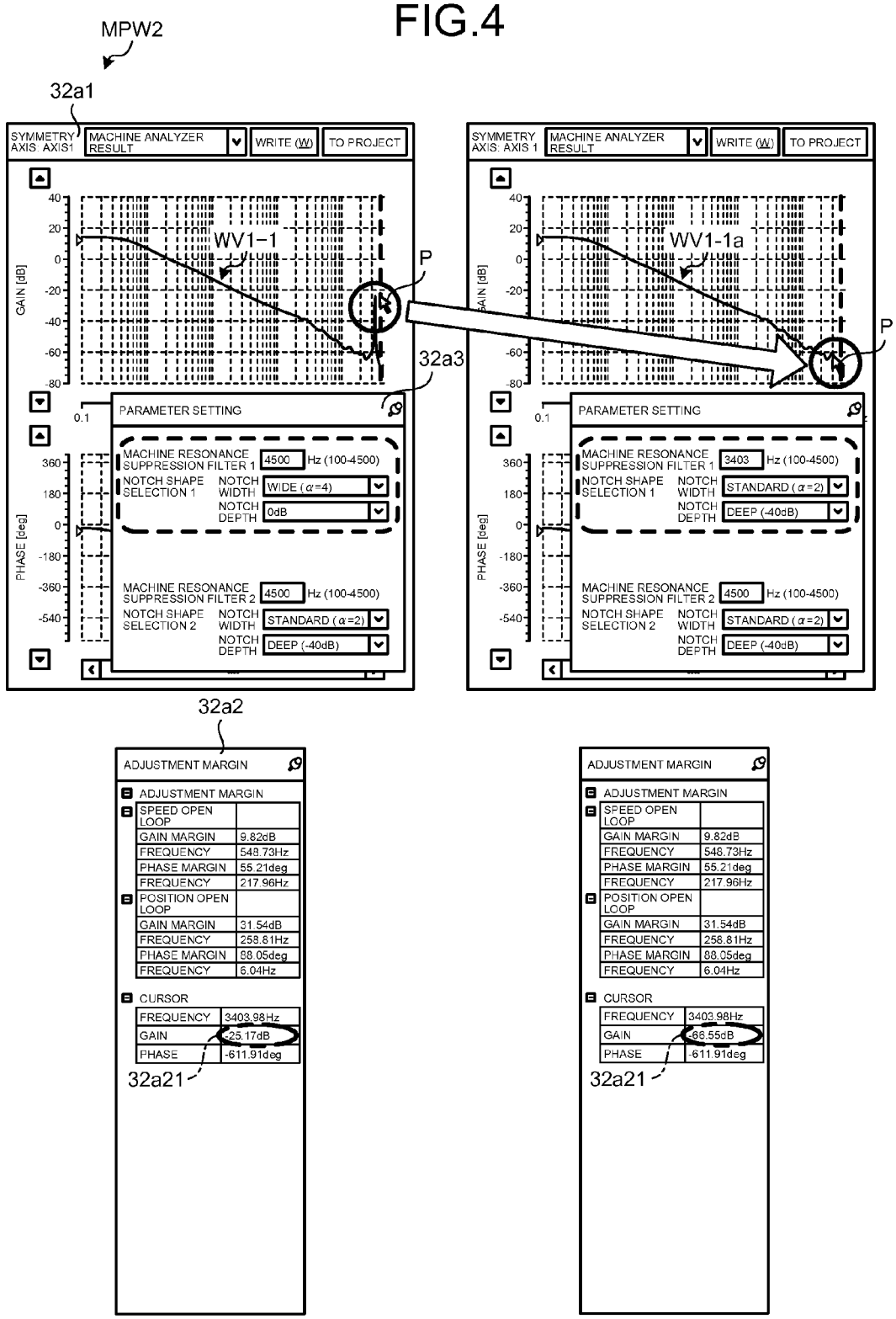
FIG. 4 is a diagram of the operation of the waveform-value changing unit and the display unit in the first embodiment.

For example, when a mechanical characteristic analysis screen MPW2 shown in a left diagram of FIG. 4 is displayed, a resonance point is present near a frequency of 3403 hertz. Therefore, the waveform-value changing unit 33a places a mouse pointer P on the resonance point and directly edits a gain value from −25.17 [dB] to −66.55 [dB].

That is, the waveform-value changing unit 33a receives, via the mouse pointer P, a drag-and-drop operation for instructions to change the gain value near the frequency of 3403 hertz from −25.17 [dB] to −66.55 [dB]. According to the drag-and-drop operation, as shown in a right diagram of FIG. 4, the display control unit 37c displays the numerical value (i.e., the waveform value) displayed in the gain column 32a21 to be changed from "−25.27 dB" to "−66.55 dB". At the same time, as shown in the right diagram of FIG. 4, in the Bode diagram 32a1, the display control unit 37c displays the waveform WV1-1 to be changed to the waveform WV1-1a and displays the waveform WV1-2 to be changed to the waveform WV1-2a. On the parameter setting screen 32a3, the display control unit 37c displays the adaptive frequency (i.e., the gain parameter) to be changed from "4500" to "3403". The display control unit 37c displays the notch width to be changed from "wide (α=4)" to "standard (α=2)" and displays the notch depth to be changed from "0 dB" to "deep (−40 dB)".

Consequently, it is possible to automatically adjust the servo parameters and check the servo parameters on the display screen 32a to suppress, for example, resonance at a frequency "3403.98 Hz".

The display control unit 37c displays, on the display screen 32a of the display unit 32, a command follow-up analysis screen corresponding to gain parameters that should be set in the position control unit 24 and the speed control unit 25 (see FIG. 1).

Figure 5:
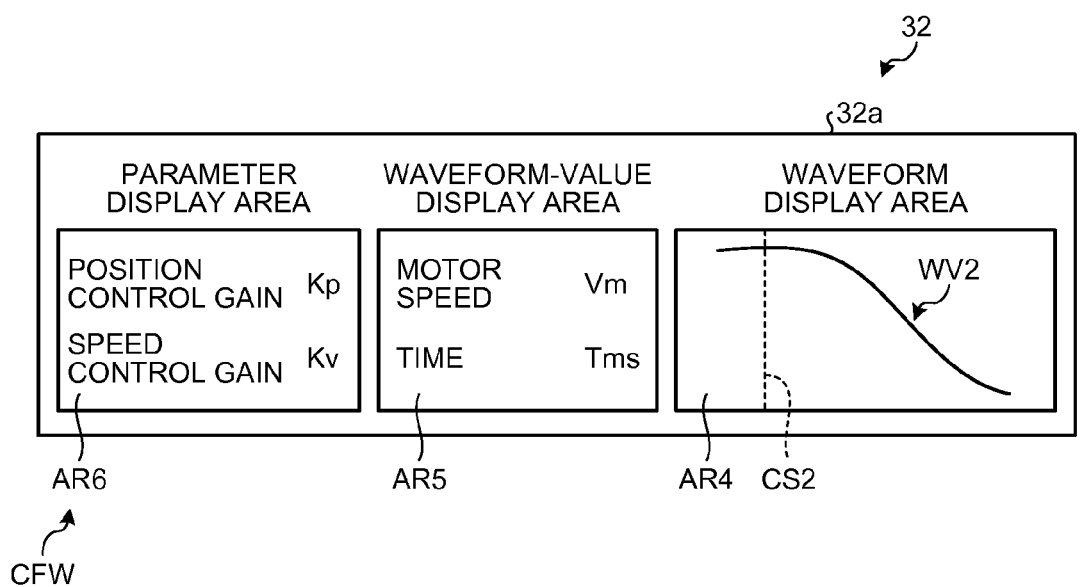
FIG. 5 is a diagram of the operation of the waveform-value changing unit and the display unit in the first embodiment.

For example, as shown in FIG. 5, the display control unit 37c displays a mechanical characteristic analysis screen CFW including a waveform display area AR4, a waveform-value display area AR5, and a parameter display area AR6 on the display screen 32a.

Figure 6:
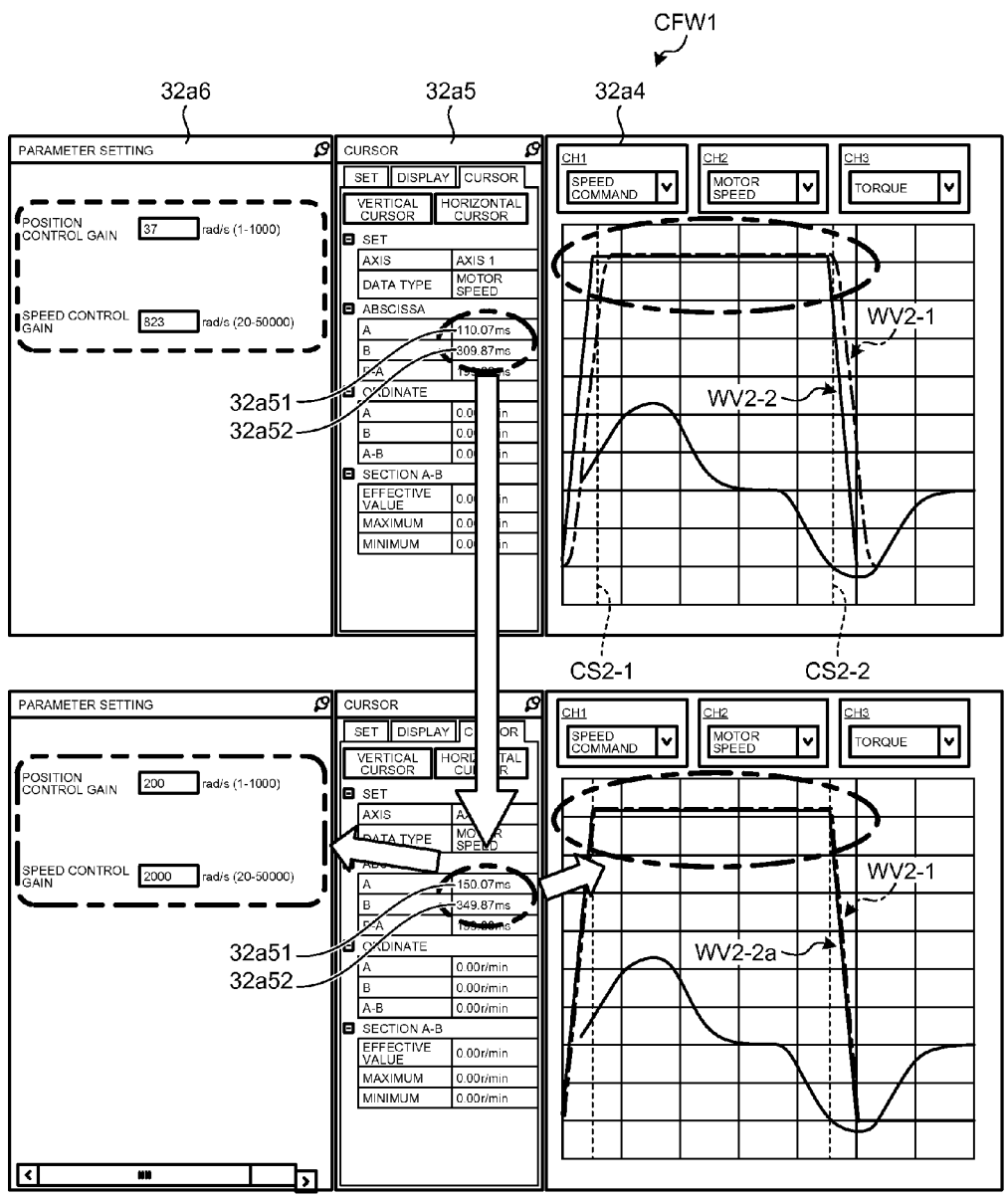
FIG. 6 is a diagram of the operation of the waveform-value changing unit and the display unit in the first embodiment.

The waveform display area AR4 is an area for displaying a waveform WV2. A cursor CS2 is also displayed to overlap a part of the waveform WV2. Specifically, in the waveform display area AR4, a command follow-up characteristic chart 32a4 shown in FIG. 6 is displayed. A waveform WV2-1 with a command value plotted on the ordinate and time plotted on the abscissa and a waveform WV2-2 with a measured value plotted on ordinate and time plotted on the abscissa are displayed. In the command follow-up characteristic chart 32a4, if CH1 is selected, the command value is a command value of the speed of the control target 11 and the measured value is a measured value of the speed of the control target 11. If CH2 is selected, the command value is a command value of motor speed and the measured value is a measured value of the motor speed. If CH3 is selected, the command value is a command value of torque and the measured value is a measured value of the torque.

The waveform-value display area AR5 shown in FIG. 5 is an area for displaying waveform values. For example, values indicating coordinates of a point where the cursor CS2 overlaps on the waveform WV2 are displayed. Specifically, in the waveform-value display area AR5, a cursor screen 32a5 shown in FIG. 6 is displayed. Values of times indicating abscissa coordinates of points where cursors CS2-1 and CS2-2 overlap on the waveform WV2-2 of the measurement value and values of measurement values (e.g., speed, motor speed, and torque of the control target 11) indicating an ordinate coordinate of a point where the cursor CS2-1 overlaps on the waveform WV2-1 are displayed.

The parameter display area AR6 shown in FIG. 5 is an area for displaying servo parameters. For example, values of a position control gain and a speed control gain are displayed as values of servo parameters corresponding to the waveform WV2. Specifically, in the parameter display area AR6, a parameter setting screen 32a6 shown in FIG. 6 is displayed. The values of the position control gain and the speed control gain are displayed.

Note that, in the second calculating unit 37b of the adjustment control unit 37, for example, when a transfer function G(s) represented by Formula 1 below is used in a general position control system, a relation 4Kp≤Kv holds.

$$G(s) = KpKv/(s^2 + Kvs + KpKv) \qquad \text{Formula 1}$$

From Formula 1, an attenuation ratio is √(Kv/Kp)/2. When Kv is set large, vibration does not occur. From responsiveness of the formula, the second calculating unit 37b calculates, for example, several candidates of Kv for setting a maximum ratio to a speed command at respective times within 5%. Subsequently, the second calculating unit 37b calculates combination patterns of Kv and Kp that satisfy 4Kp≤Kv. However, a simple model is assumed in the above calculation.

When feedback control is complicated, parameters can also be calculated in a speed control system and a position control system.

The waveform-value changing unit 33a uses the display screen 32a shown in FIG. 5 as an input screen and changes displayed waveform values according to an input of at least one of numerical values and characters to the waveform-value display area AR5.

For example, when a command follow-up analysis screen CFW1 shown in an upper diagram of FIG. 6 is displayed, because followability to a command of motor speed is low, the cursors CS2-1 and CS2-2 are placed on a place where an acceleration and deceleration section changes to a constant speed section and instantaneous motor speed is edited to near a command value.

That is, the waveform-value changing unit 33a moves, via the mouse pointer or the like, the cursors CS2-1 and CS2-2 to the place where the acceleration and deceleration section changes to the constant speed section and selects abscissa columns 32a51 and 32a52 of the cursor screen 32a5. According to the selection of the abscissa columns 32a51 and 32a52, the display control unit 37c changes a display form of the abscissa columns 32a51 and 32a52 to a state for enabling an input. The waveform-value changing unit 33a receives, via the keyboard or the like, inputs of numerical values "150.07 ms" and "349.87 ms" to the abscissa columns 32a51 and 32a52. According to the input of the numerical values, as shown in a lower diagram of FIG. 6, the display control unit 37c displays a numerical value (i.e., a waveform value) displayed in the abscissa column 32a51 to be changed from "110.07 ms" to "150.07 ms" and displays a numerical value (i.e., a waveform value) displayed in the abscissa column 32a52 to be changed from "309.87 ms" to "349.87 ms". At the same time, as shown in the lower diagram of FIG. 6, in the command follow-up characteristic chart 32a4, the display control unit 37c displays the waveform WV2-2 to be changed to a waveform WV2-2a. On the parameter setting screen 32a6, the display control unit 37c displays a position control gain (i.e., a gain parameter) to be changed from "37" to "200" and displays a speed control gain (i.e., a gain parameter) to be changed from "823" to "2000". Note that, in this case, it is also possible that position control system gain parameters are tabulated on the basis of speed control gain parameters and an optimum position control system gain parameter is automatically selected out of the tabulated parameter group.

Consequently, it is possible to automatically adjust the servo parameters and check the servo parameters on the display screen 32a such that the measured value (the waveform WV2-2a) substantially coincides with and follows the command value (the waveform WV2-1).

Alternatively, for example, the waveform-value changing unit 33a uses the display screen 32a shown in FIG. 5 as an input screen and changes displayed waveform values according to an input by the mouse pointer to the waveform display area AR4.

Figure 7:
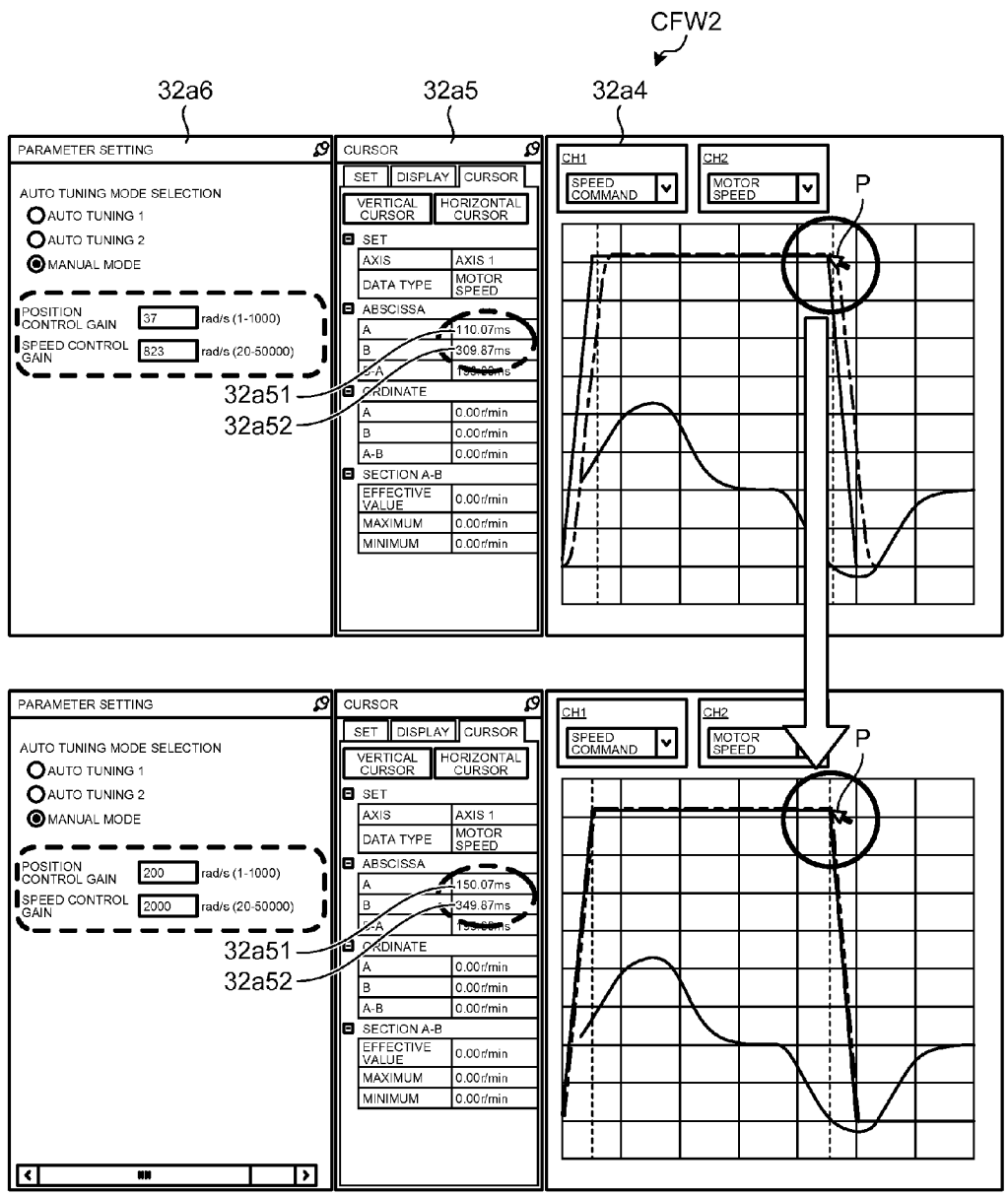
FIG. 7 is a diagram of the operation of the waveform-value changing unit and the display unit in the first embodiment.

For example, when a command follow-up analysis screen CFW2 shown in an upper diagram of FIG. 7 is displayed, because followability to a command of motor speed is low, the mouse pointer P is placed on a place where an acceleration and deceleration section changes to a constant speed section and instantaneous motor speed is edited to near a command value.

That is, the waveform-value changing unit 33a receives, via the mouse pointer P, drag-and-drop operation for instructing the waveform-value changing unit 33a to change time in the place where the acceleration and deceleration section changes to the constant speed section from 110.07 milliseconds to 150.07 milliseconds and drag-and-drop operation for instructing the waveform-value changing unit 33a to change the time in a place where the constant speed section changes to the acceleration and deceleration section from 309.87 milliseconds to 349.87 milliseconds. According to the drag-and-drop operation, as shown in a lower diagram of FIG. 7, the display control unit 37c displays a numerical value (i.e., a waveform value) displayed in the abscissa column 32a51 to be changed from "110.07 ms" to "150.07 ms" and displays a numerical value (i.e., a waveform value) displayed in the abscissa column 32a52 to be changed from "309.87 ms" to "349.87 ms". At the same time, as shown in the lower diagram of FIG. 7, in the command follow-up characteristic chart 32a4, the display control unit 37c displays the waveform WV2-2 to be changed to the waveform WV2-2a. On the parameter setting screen 32a6, the display control unit 37c displays a position control gain (i.e., a gain parameter) to be changed from "37" to "200" and displays a speed control gain (i.e., a gain parameter) to be changed from "823" to "2000". Note that, in this case, it is also possible that position control system gain parameters are tabulated on the basis of speed control gain parameters and an optimum position control system gain parameter is automatically selected out of the tabulated parameter group.

Consequently, it is possible to automatically adjust the servo parameters and check the servo parameters on the display screen 32a such that the measured value (the waveform WV2-2a) substantially coincides with and follows the command value (the waveform WV2-1).

As explained above, in the first embodiment, in the servo-parameter adjusting apparatus 30, the display control unit 37c simultaneously displays, on the display screen 32a, a waveform corresponding to an adjustment result, waveform values that are attributes concerning a part of the waveform, and servo parameters corresponding to the waveform. The waveform-value changing unit 33a changes a waveform value displayed on the display screen 32a. When the waveform value is changed by the waveform-value changing unit 33a, the display control unit 37c displays the changed waveform value to be changed on the display screen 32a and displays a waveform corresponding to the changed waveform value and a servo parameter corresponding to the changed waveform value to be changed on the display screen 32a. Consequently, it is possible to automatically edit the servo parameters to appropriate values simply by editing the waveform values displayed on the display screen 32a. Therefore, it is unnecessary to perform parameter adjustment in a trial and error manner. It is possible to reduce adjustment time for servo parameters to be set in the servo control apparatus 20.

In the first embodiment, the waveform-value changing unit 33a changes a waveform value, which is an attribute concerning a part of the waveform displayed on the display screen 32a. Consequently, it is possible to perform editing of a part of the waveform displayed on the display screen 32a and adjust a servo parameter corresponding to the change of the part. Consequently, when the user desires to change only a part of the waveform, the user does not need to repeat work for "a change of parameters to a check of a waveform" in a trial and error manner. Therefore, it is possible to reduce an adjustment time for the servo parameters.

In the first embodiment, the parameter writing unit 35 writes the servo parameter corresponding to the changed waveform value in the servo control apparatus 20. Consequently, it is possible to set the automatically adjusted servo parameter in the servo control apparatus 20.

In the first embodiment, for example, the waveform-value changing unit 33a uses the display screen 32a as an input screen and changes the displayed waveform value according to an input of at least one of numerical values and characters to the waveform-value display area. Consequently, it is possible to change the displayed waveform value with simple operation.

In the first embodiment, for example, the waveform-value changing unit 33a uses the display screen 32a as an input screen and changes the displayed waveform value according to an input by the mouse pointer to the waveform display area. Consequently, it is possible to change the displayed waveform with simple operation.

In the first embodiment, the waveform displayed on the display screen 32a is a waveform of a mechanical characteristic (a gain characteristic) with a gain plotted on the ordinate and a frequency plotted on the abscissa. The waveform-value changing unit 33a changes an ordinate coordinate of a point on the waveform. Consequently, it is possible to automatically adjust the servo parameters and check the servo parameters on the display screen 32a to suppress residual vibration (e.g., resonance and anti-resonance) of the control target 11.

In the first embodiment, the waveforms displayed on the display screen 32a are waveforms of a command follow-up characteristic with a measured value and a command value plotted on the ordinate and time plotted on the abscissa. The waveform-value changing unit 33a changes an abscissa coordinate on the waveform. Consequently, it is possible to automatically adjust the servo parameters and check the servo parameters on the display screen 32a such that the measured value substantially coincides with and follows the command value.

Note that automatically edited parameter values can be highlighted by enhanced colors, bold characters, italics, underlines, or the like on the parameter setting screen 32a3 shown in FIGS. 3 and 4 and the parameter setting screen 32a6 shown in FIGS. 6 and 7. Consequently, when automatically edited servo parameters and servo parameters not automatically edited are mixed on the parameter setting screen, it is possible to easily check which servo parameters are edited.

Alternatively, the parameter values before the automatic editing and after the automatic editing can be displayed in parallel. Consequently, the user can compare the parameters before the automatic editing and the parameters after the automatic editing and check whether the automatic editing is appropriately performed.

Alternatively, the parameters after the automatic editing can be restored to the parameters before the automatic editing on the parameter setting screen 32a3 shown in FIGS. 3 and 4 and the parameter setting screen 32a6 shown in FIGS. 6 and 7. That is, because the parameter storing unit 34a stores the servo parameters before the automatic editing, the display control unit 37c can restore the servo parameters after the automatic editing to the servo parameters before the automatic editing and display the servo parameters before the automatic editing referring to the parameter storing unit 34a. Because the waveform-value storing unit 34b stores waveform values before the automatic editing, the display control unit 37c can restore waveform values after the automatic editing to the waveform values before the automatic editing and display the waveform values before the automatic editing. According to the display of the waveform values before the automatic editing, the display control unit 37c can restore a waveform after the automatic editing to a waveform before the automatic editing and display the waveform before the automatic editing.

Alternatively, the display control unit 37c can simultaneously display a plurality of waveforms, waveform values, and servo parameters on the display screen 32a. For example, the display control unit 37c can simultaneously display a plurality of waveforms corresponding to CH1 to CH3 shown in FIG. 6 on the display screen 32a. In this case, waveform values common to the waveforms are displayed on the cursor screen 32a5. Therefore, the waveform-value changing unit 33a changes the waveform values common to the waveforms. When the waveform values are changed by the waveform-value changing unit 33a, the display control unit 37c collectively displays the waveforms corresponding to the changed waveform values to be changed on the display screen 32a. Therefore, because measured values can be edited to desired values at a time in the waveforms, it is possible to further reduce the adjustment time for servo parameters to be set in the servo control apparatus 20.

Second Embodiment

Figure 8:
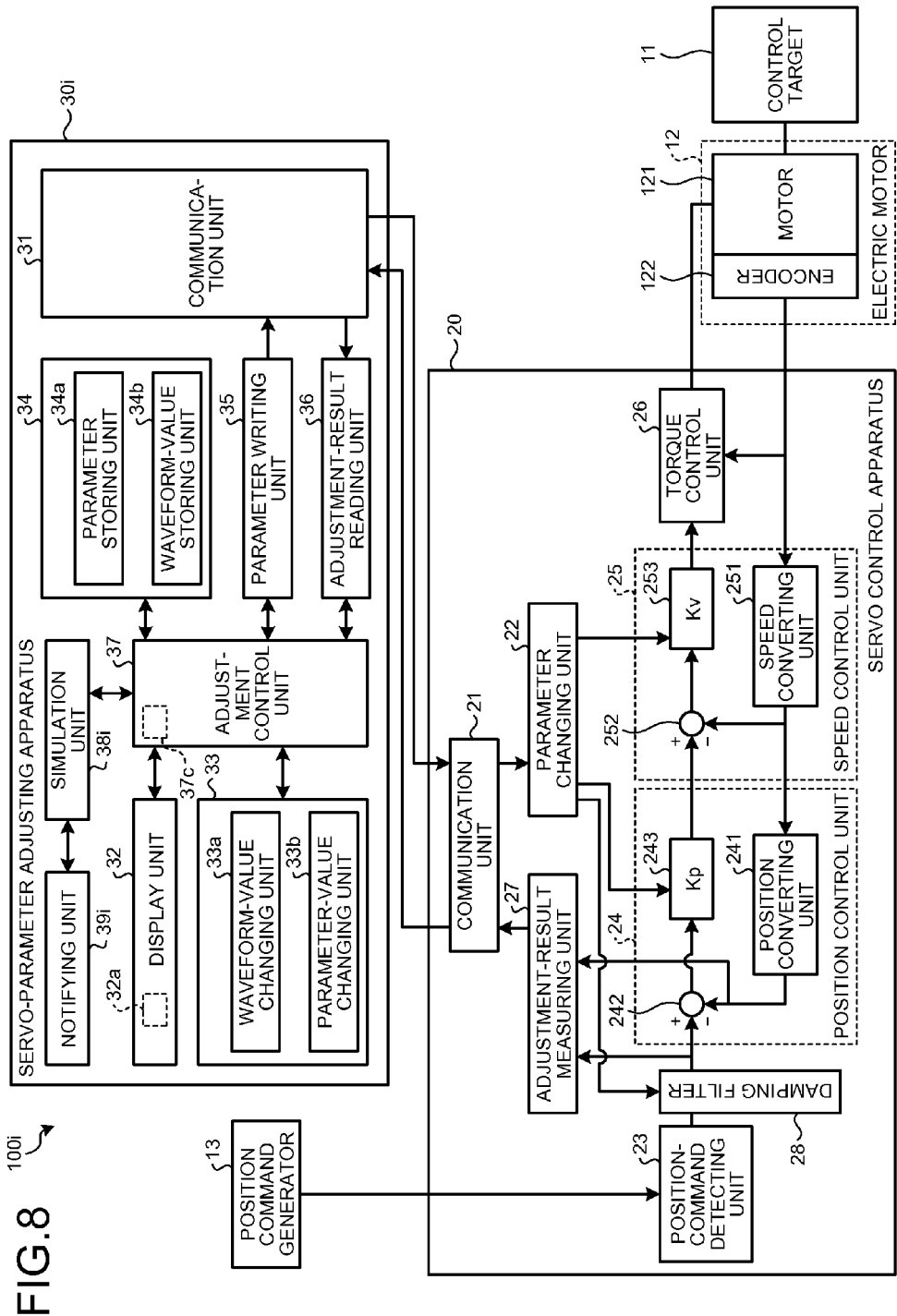
FIG. 8 is a diagram of the configuration of a servo control system including a servo-parameter adjusting apparatus according to a second embodiment.

A servo-parameter adjusting apparatus 30i according to a second embodiment is explained with reference to FIG. 8. FIG. 8 is a diagram of the configuration of a servo control system 100i including the servo-parameter adjusting apparatus 30i.

In the first embodiment, when the waveform values are edited to the desired values, the servo parameters satisfying the desired values are automatically calculated. The automatically edited servo parameters are displayed in the parameter display area. In this case, for example, when motor speed is caused to follow a command, it is likely that a parameter value of a control gain is excessively large and overshoot occurs. When a plurality of commands (operation conditions) is present, it is necessary to check whether an operation is possible under other operation conditions without causing overshoot or the like.

In the second embodiment, means capable of checking, through a simulation, a warning is not issued under other conditions before checking a real machine is provided.

Specifically, the servo-parameter adjusting apparatus 30i of the servo control system 100i further includes a simulation unit 38i and a notifying unit 39i. The simulation unit 38i performs a simulation of the operations of the motor 121 and the control target 11 using servo parameters displayed to be changed by the display control unit 37c. In this case, the simulation unit 38i can performs the simulation of the operations of the motor 121 and the control target 11 concerning a plurality of kinds of automatically edited servo parameters. The notifying unit 39i notifies a user of a warning according to a simulation result by the simulation unit 38i. For example, the notifying unit 39i notifies the user of a warning according to the simulation result by the simulation unit 38i when characteristics of the operations of the motor 121 and the control target 11 exceed an allowable range. Note that a method of the notification by the notifying unit 39i can be, for example, a method of displaying a warning message on the display screen 32a, a method of lighting a lamp such as an LED, or a method of outputting warning sound from a speaker.

More specifically, the servo-parameter adjusting apparatus 30i can perform an operation explained below. The servo-parameter adjusting apparatus 30i displays a waveform in real machine measurement in a waveform display area. Subsequently, the servo-parameter adjusting apparatus 30i displays, in the waveform display area, a waveform value on which a cursor is placed and displays various parameters at that point in a parameter display area. When the servo-parameter adjusting apparatus 30i edits measured values of a plurality of waveforms to desired values in the waveform display area, the servo-parameter adjusting apparatus 30i immediately reflects the values on the waveforms displayed in the waveform display area. Similarly, the servo-parameter adjusting apparatus 30i automatically calculates parameter values that satisfy the desired values of the waveforms and reflects the parameter values on the parameters in the parameter display area. For example, when an overshoot amount calculated by inverse conversion of a transfer function exceeds an allowable range compared with a condition predicted in a real machine (e.g., satisfies an oscillation condition), the servo-parameter adjusting apparatus 30i displays a warning message on a screen (of, for example, oscillation).

As explained above, in the second embodiment, the simulation unit 38i performs the simulation of the operations of the motor 121 and the control target 11 using the servo parameters displayed to be changed by the display control unit 37c. The notifying unit 39i notifies the user of a warning according to a simulation result by the simulation unit 38i. Consequently, it is possible to take preliminary measures by informing the user of various warnings before performing real machine adjustment, reduce trial-and-error check work in the real machine, and perform parameter adjustment safely and in a short time in a real machine environment. In other words, it is possible to perform servo adjustment without affecting the real machine environment.

In the second embodiment, the simulation unit 38i performs the simulation of the operations of the motor 121 and the control target 11 concerning a plurality of kinds of automatically edited servo parameters. The simulation can be executed using the parameters after the automatic editing by changing other operation conditions (changing command conditions). Consequently, it is possible to check measurement results of items other than desired conditions before a real machine check.

Note that, in this case, the display control unit 37c can highlight a parameter group (recommended values) closest to ideal values using enhanced colors, bold characters, italics, underlines, or the like. Consequently, it is possible to easily select the parameter group closest to the ideal values out of parameter groups that do not cause a warning.

INDUSTRIAL APPLICABILITY

As explained above, the servo-parameter adjusting apparatus according to the present invention is useful for adjustment of servo parameters.

REFERENCE SIGNS LIST

11 Control target
12 Electric motor
13 Position command generator
20 Servo control apparatus
21 Communication unit
22 Parameter-value changing unit
23 Position-command detecting unit
24 Position control unit
25 Speed control unit
26 Torque control unit
27 Adjustment-result measuring unit
28 Damping filter
30, 30i Servo-parameter adjusting apparatuses
31 Communication unit
32 Display unit
32a Display screen
33 Input unit
33a Waveform-value changing unit
33b Parameter-value changing unit
34 Storing unit
34a Parameter storing unit
34b Waveform-value storing unit
35 Parameter writing unit
36 Adjustment-result reading unit
37 Adjustment control unit
37a First calculating unit
37b Second calculating unit
37c Display control unit
37d Third calculating unit
38i Simulation unit
39i Notifying unit
100, 100i Servo control systems
121 Motor
122 Encoder
241 Position converting unit
242 Subtracter
243 Speed-command generating unit
251 Speed converting unit
252 Subtracter
253 Torque-command generating unit

The invention claimed is:

1. A servo-parameter adjusting apparatus that performs adjustment of servo parameters to be set in a servo control apparatus that controls a motor for driving a control target, the servo-parameter adjusting apparatus comprising:
a first calculator configured to acquire, from the servo control apparatus, an adjustment result measured by the servo control apparatus concerning position adjustment for the control target performed according to the servo parameters set in the servo control apparatus;
a display controller configured to simultaneously display, on a display screen, a waveform corresponding to the acquired adjustment result, waveform values that are coordinates of one point on the waveform, and values of servo parameters which form the displayed waveform;
a waveform-value changing module configured to change the displayed waveform values in response to the servo parameters being changed by a user input;
a second calculator configured to calculate, when a waveform value is changed by the waveform-value changing module, waveform information such that continuity of the waveform is maintained, the waveform information being a set of coordinates of a plurality of points on a waveform corresponding to the changed waveform value; and
a damping filter,
wherein when a waveform value is changed by the waveform-value changing module, the display controller displays the changed waveform value on the display screen and displays, on the display screen, a waveform including the set of coordinates of the waveform information and a servo parameter corresponding to the changed waveform value,
wherein the servo parameters includes a resonance frequency of the damping filter, and the display waveform indicates resonance frequency values and corresponding gain values of the damping filter.

2. The servo-parameter adjusting apparatus according to claim 1, further comprising a parameter writing module configured to write the servo parameter corresponding to the changed waveform value in the servo control apparatus.

3. The servo-parameter adjusting apparatus according to claim 1,
wherein the display screen includes a waveform display area where the waveform is displayed, a waveform-value display area where the waveform values are displayed, and a parameter display area where the servo parameters are displayed, and wherein the waveform-value changing module uses the display screen as an input screen and changes the displayed waveform values according to an input of at least one of numerical values and characters to the waveform-value display area.

4. The servo-parameter adjusting apparatus according to claim 1, wherein the display screen includes a waveform display area where the waveform is displayed, a waveform-value display area where the waveform values are displayed, and a parameter display area where the servo parameters are displayed, and wherein the waveform-value changing module uses the display screen as an input screen and changes the displayed waveform values according to an input by a mouse pointer to the waveform display area.

5. The servo-parameter adjusting apparatus according to claim 1, wherein the displayed waveform is a waveform of a mechanical characteristic with a gain plotted on an ordinate and a frequency plotted on an abscissa.

6. The servo-parameter adjusting apparatus according to claim 5, wherein the waveform values are coordinates of a point on the waveform, and wherein the waveform-value changing module changes an ordinate coordinate of the point on the waveform.

7. The servo-parameter adjusting apparatus according to claim 1, wherein the displayed waveform is a waveform of a command follow-up characteristic with a measured value and a command value plotted on an ordinate and time plotted on an abscissa.

8. The servo-parameter adjusting apparatus according to claim 7, wherein the waveform values are coordinates of a point on the waveform, and wherein the waveform-value changing module changes an abscissa coordinate on the waveform.

9. The servo-parameter adjusting apparatus according to claim 1, wherein the display controller simultaneously displays, on the display screen, a plurality of the waveforms, the waveform values, and the servo parameters, and, when a waveform value is changed by the waveform-value changing module, collectively displays, on the display screen, a plurality of waveforms corresponding to the changed waveform value.

10. The servo-parameter adjusting apparatus according to claim 1, further comprising:

a simulator configured to perform a simulation of operations of the motor and the control target by using the servo parameter displayed; and a notifying module configured to notify a user of a warning according to a simulation result by the simulator.

* * * * *